Dec. 2, 1969  A. J. PROCOP  3,481,662
FILM HANDLING MECHANISM FOR A MOVING PICTURE PROJECTOR
Filed March 2, 1967  7 Sheets-Sheet 1
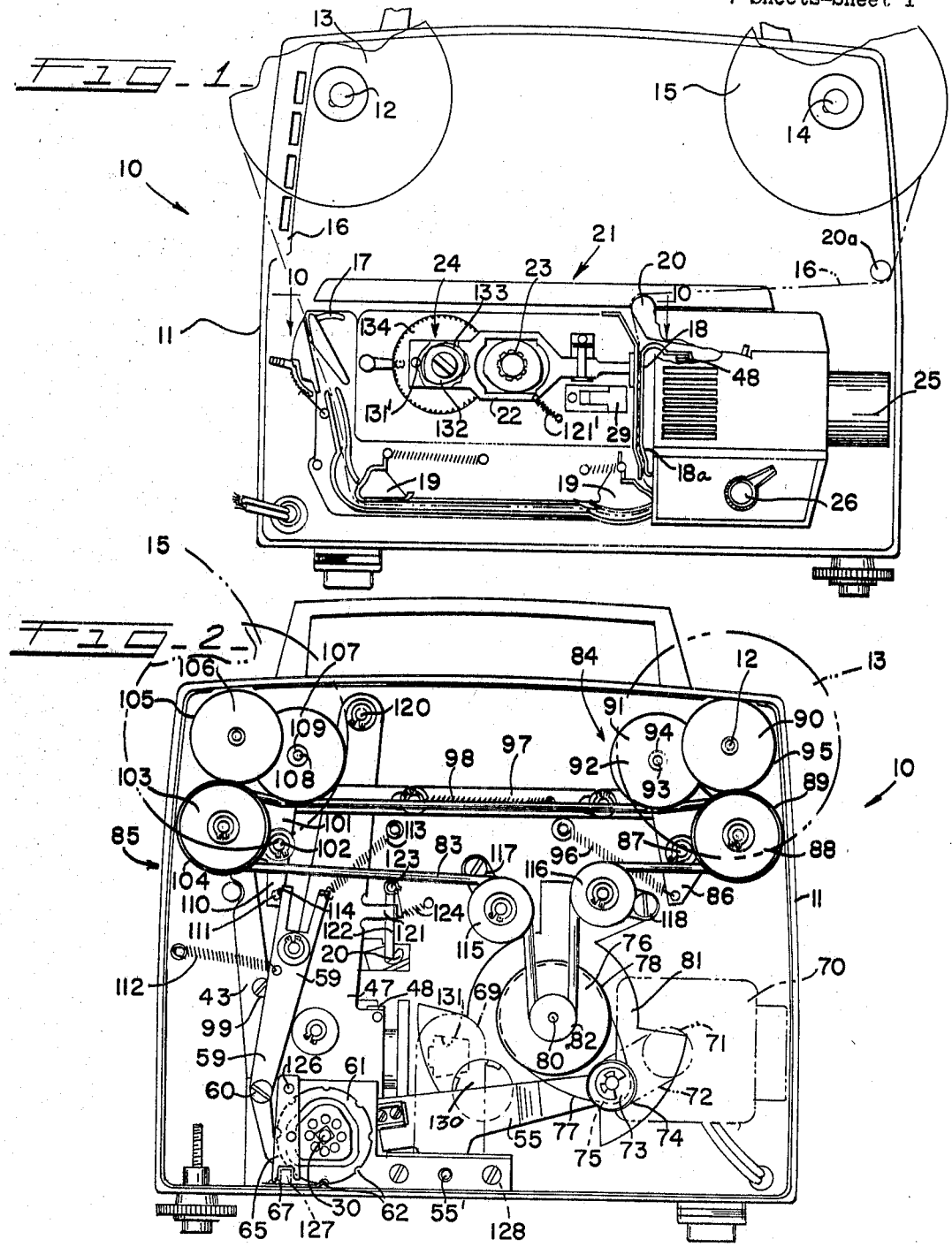
INVENTOR
ALEX J. PROCOP
BY Greist, Lockwood,
Greenawalt & Dewey  ATT'YS.

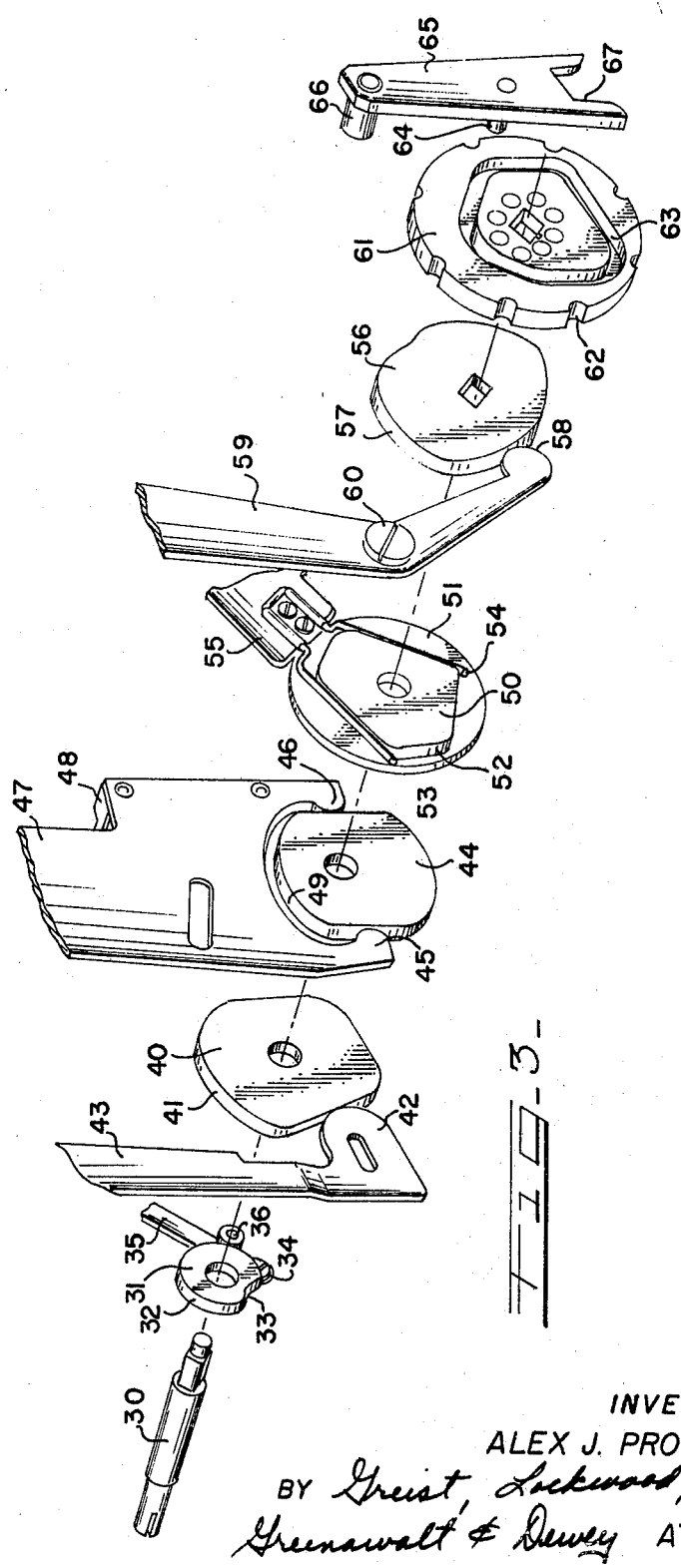

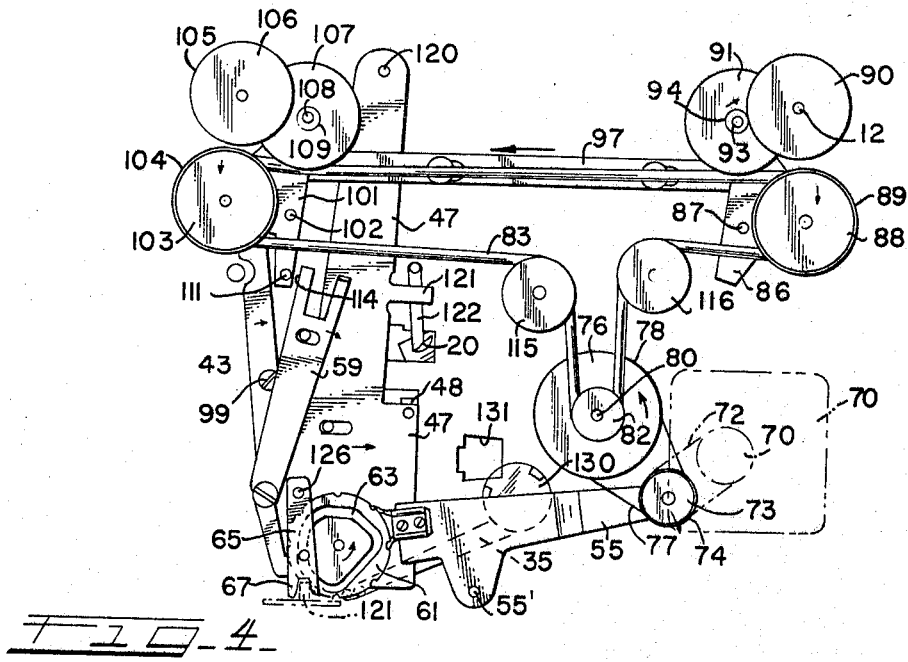

Dec. 2, 1969  A. J. PROCOP  3,481,662
FILM HANDLING MECHANISM FOR A MOVING PICTURE PROJECTOR
Filed March 2, 1967  7 Sheets-Sheet 4

INVENTOR
ALEX J. PROCOP
BY Greist Lockwood,
Greenawalt & Dewey  ATT'YS.

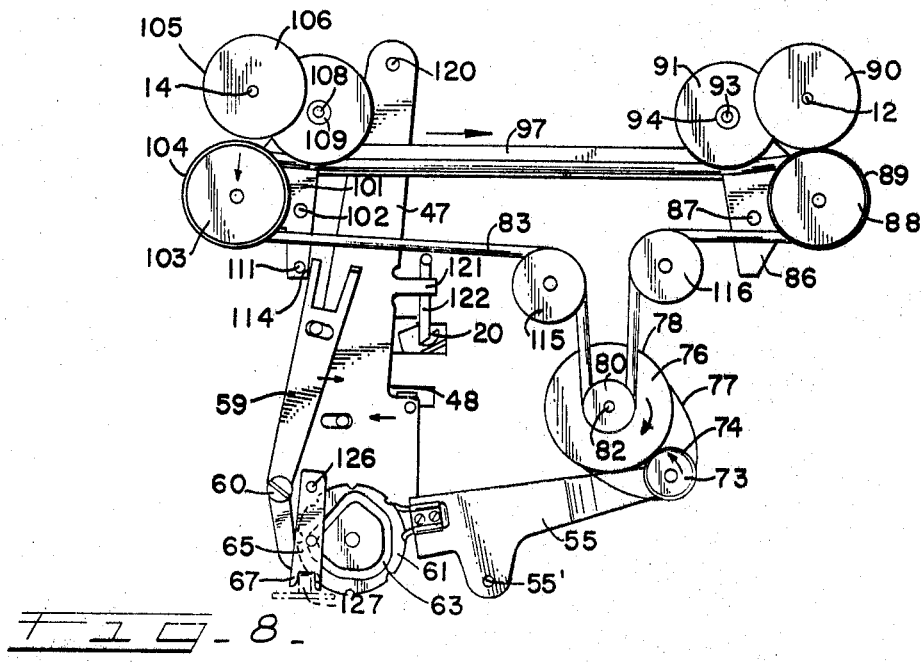
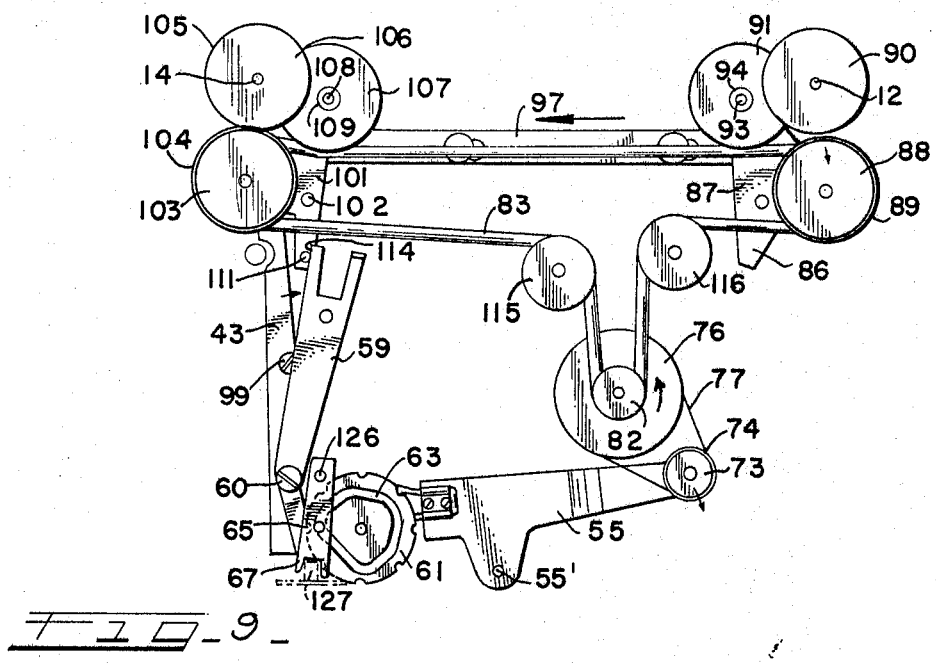

Dec. 2, 1969     A. J. PROCOP     3,481,662
FILM HANDLING MECHANISM FOR A MOVING PICTURE PROJECTOR
Filed March 2, 1967     7 Sheets-Sheet 6

INVENTOR
ALEX J. PROCOP
BY Greist, Lockwood,
Greenawalt & Dewey ATT'YS.

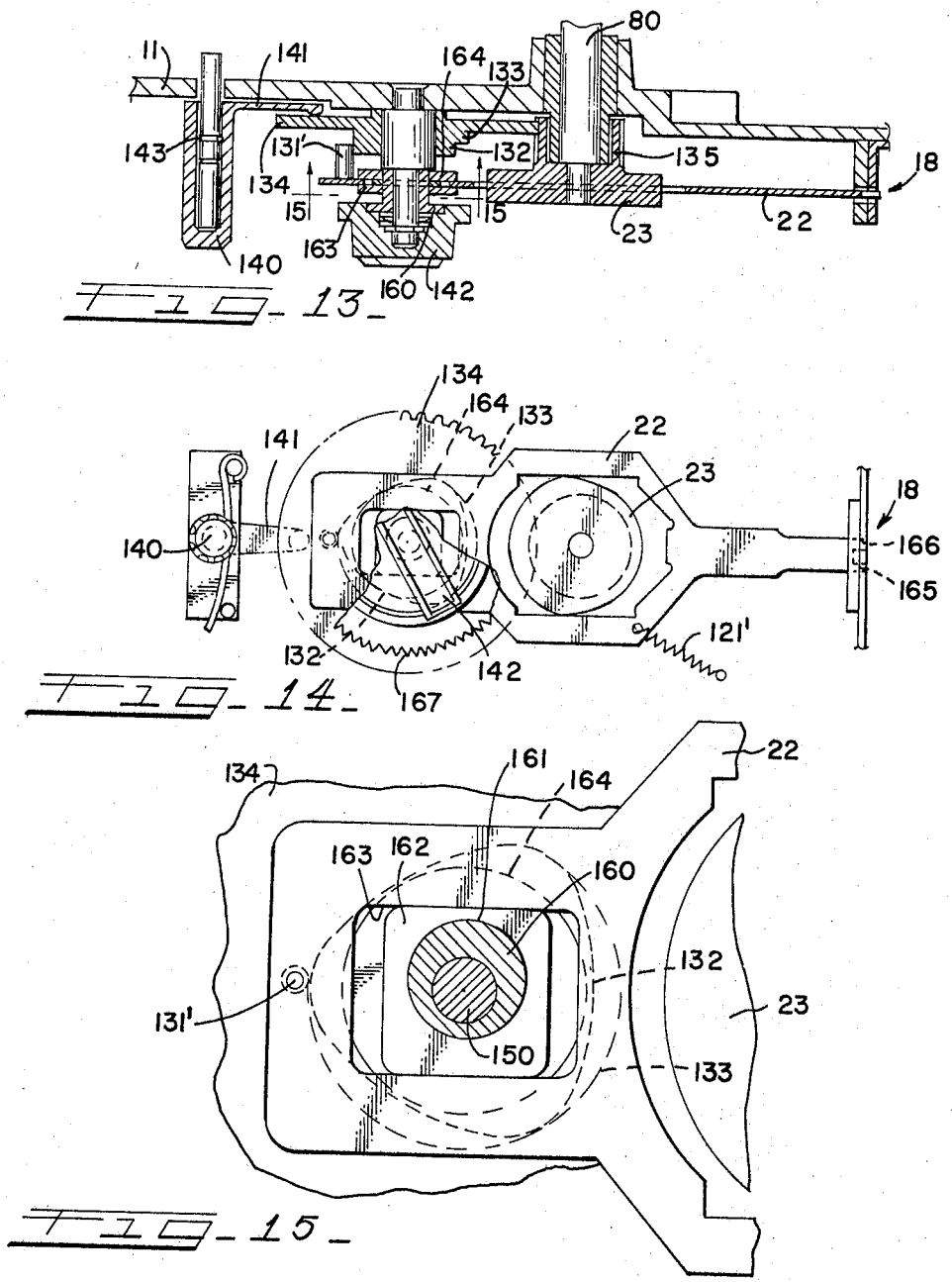

United States Patent Office 3,481,662
Patented Dec. 2, 1969

3,481,662
FILM HANDLING MECHANISM FOR A
MOVING PICTURE PROJECTOR
Alex P. Procop, Northridge, Calif., assignor to GAF
Corporation, a corporation of Delaware
Filed Mar. 2, 1967, Ser. No. 619,992
Int. Cl. G03b 21/48
U.S. Cl. 352—180                                    18 Claims

ABSTRACT OF THE DISCLOSURE

A pair of rollers of different diameters are shiftably mounted adjacent the take-up-reel wheel for alternate driving engagement with the latter. An endless belt engages these two rollers for driving the same in opposite directions when the belt is driven in one direction. Another pair of rollers of different diameters are shiftably mounted adjacent the supply reel wheel for alternate driving engagement with the latter. The same endless belt drives these two rollers in opposite directions when the belt is driven in one direction. This endless belt is driven in one direction by a drive belt from the motor and the endless belt is driven in the opposite direction by direct contact between two drive wheels. By this arrangement, the take-up reel is driven in the same direction at two rates of speed for "forward" and "fast forward" operation, and the supply reel is driven in the same direction at two rates of speed for "reverse" operation and "rewind" operation. Slow motion may be imparted to the film by a pair of in and out cams which are associated with a single up and down cam. The in and out cams rotate in unison and may be shifted along their axis of rotation for alternate engagement with a cam follower on the drive claw, thereby to impart in and out movements to the drive claw at different time relations with up and down movements for achieving normal speed and slow motion.

Background of the invention

The field of the invention resides in means for feeding and handling movie film in a moving picture projector. The prior art patents known to the applicant are Foster et al. No. 2,005,738, Briskin et al. No. 2,907,532, Griffioin et al. No. 3,181,174, Schellschmidt No. 3,252,748 and Faber et al. No. 3,261,654. Some of these patents show rather complicated mechanisms for achieving a plurality of modes of projector operation. The present invention represents an improvement over these patents by providing for a considerable number of modes of projector operation by a unique cam and linkage arrangement of simplified construction. Some of these patents show slow motion construction by the use of a considerable number of cams and other moving parts. The present invention represents an improvement over these patents by providing slow motion feed by the use of simplified cams compatible with a novel framing arrangement.

Summary of the invention

The invention relates in a general way to moving picture projectors, and more particularly the invention relates to new and improved means for feeding the moving picture film in opposite directions and at different speeds in each direction. The invention may be summarized as consisting of a unique film feeding mechanism having a linkage and drive arrangement controllable from a single control knob, whereby any one of a plurality of modes of operation may be readily selected. The film feeding mechanism further includes uniquely arranged in and out cams driven in timed relation with an up and down cam, the former being shiftable for alternate engagement with the drive claw thereby to provide different rates of speed for the film.

A primary object of the present invention is the provision of a new and improved cam and linkage arrangement for feeding a moving picture film alternately in opposite directions and at different speeds in each direction.

Another object of the invention is the provision of a new and improved cam arrangement for driving the film at a speed permitting slow motion viewing of the frames thereon.

Still another object of the invention is the provision of unique framing construction compatible with the aforementioned slow motion cam arrangement.

Another object of the invention is the provision of a new and improved cam and linkage arrangement for feeding the film alternately in opposite directions and at different rates of speed in each direction, such cam and linkage arrangement being controlled by a single control member which permits selection of any one of a plurality of modes of operation, such as "rewind," "forward," "reverse," "still," "stop" and "fast forward," the cam and linkage mechanism thereby serving to interrupt the film drive train, and perform other mechanical and electrical operations incident to establishing the selected mode of projector operation.

Still aonther object of the invention is the provision of a moving picture projector having the aforementioned objects and yet being of simplified construction lending itself to economical and low cost manufacture.

These and other objects and advantages of the invention will become apparent from the following specification disclosing a preferred embodiment shown in the accompanying drawings wherein:

Description of the drawings

FIG. 1 is a side elevational view of the projector with the cover over the film advance mechanism removed;

FIG. 2 is a side elevational view of the side opposite that shown in FIG. 1 with the housing shell removed to illustrate the linkage mechanism, the linkage being illustrated in the position assumed when the control knob is in the "off" position;

FIG. 3 is an exploded perspective view of the various cams and cooperating followers on the linkage mechanism which are operated by the single knob control;

FIG. 4 is a free body schematic view of the linkage mechanism with the mounting case omitted, the motor shown in phantom and the control knob in the "forward" mode of operation;

FIG. 5 is a view similar to FIG. 4 illustrating the positions assumed by the cams and associated links when the knob is moved to the "still" mode of operation;

FIG. 8 is a view similar to FIGS. 4 through 7 illustrating the positions of the various parts when the knob is in the "fast forward" mode of operation;

FIG. 9 is a view similar to FIGS. 4 through 8 illustrating the conditions assumed when the knob is in the "rewind" mode of operation;

FIG. 13 is a cross-sectional view taken along the lines 13—13 of FIG. 12;

FIG. 14 is an elevational view similar to FIG. 12 with portions of the framing knob broken away; and FIG. 15 is an enlarged cross-sectional view taken generally along the lines 15—15 of FIG. 13.

Description of a preferred embodiment

Figure 6:
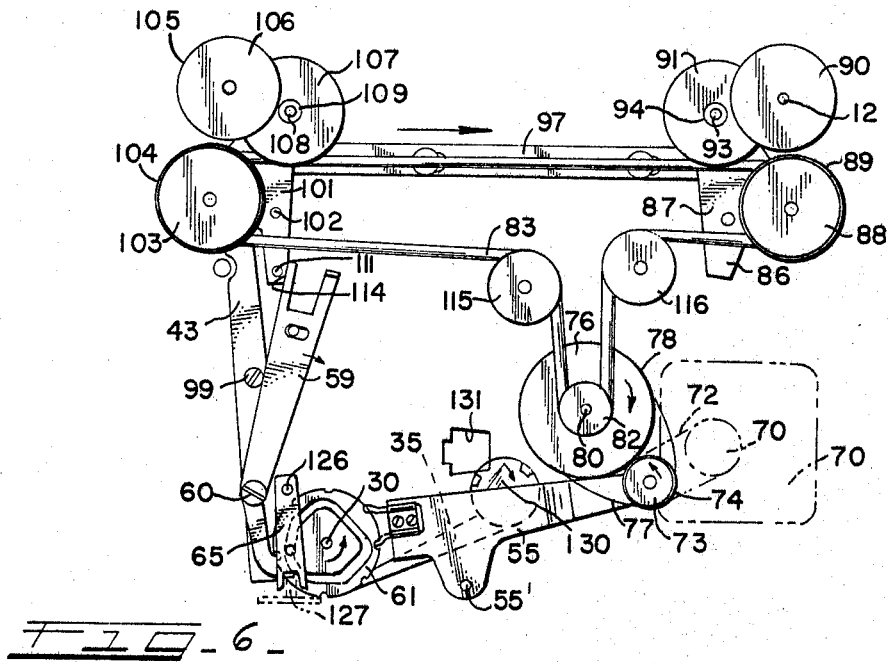
FIG. 6 is a view similar to FIGS. 4 and 5 with the knob in the "reverse" mode of operation.

Referring now to FIG. 1, a motion picture projector is indicated generally at 10, consisting of a case 11 on which is mounted a spindle 12 supporting a take-up reel shown fragmentarily at 13. A second spindle 14 is journaled at the forward part of the case 11 and mounts a supply reel 15 of conventional design. The path of the film is shown by the phantom lines 16 and in the direction of forward movement extends around a hub 20a, a tensioning guide or snubber 20, through a film gate 18, past tension means 19, and finally through a take-up adjustment 17.

A drive and framing assembly 21 includes a drive claw 22 which is moved in a vertical direction by an up and down cam 23. A framing adjustment and speed selector is indicated generally at 24 and will be described in detail in the description of FIGS. 10 through 15. For immediate purposes of understanding the invention, the drive claw 22 functions to pull the film 16 through the film gate 18 at a selected rate of speed for projection on a screen (not shown) through the lens assembly 25 of conventional construction.

The desired mode of projector operation is selected by means of a selector knob 26 disposed immediately below the lens assembly 25. The selector knob has eight different positions which, starting at the position indicated in FIG. 1 and moving clockwise, include "reverse," "stop," "fast forward," "stop," "rewind," "off," "forward" and "still." Accordingly, by rotation of the knob 26, these modes of operation may be readily selected.

Referring to FIG. 2, the opposite side of the projector 10 shown in FIG. 1 is illustrated with the cover omitted to illustrate the various operational components which serve to control the film guide, control the take-up and supply reels and condition the mechanical and electrical parts to perform the various modes of operation. In the lower left-hand corner of the case 11 a shaft 30 is mounted which projects through the case and mounts the selector knob 26. A stacked array of cams are located on the shaft 30 and are provided with suitable cam followers which act to condition the mechanically and electrically operated parts of the projector for the selected mode of operation. These cams are illustrated in the exploded perspective view of FIG. 3 with the associated cam followers indicated fragmentarily. The cams are indicated in the phase relation and location found when the selector knob is positioned in the "off" position illustrated in FIG. 2. It is to be understood that they may be joined to the associated shaft by any suitable means, such as adhesive, key, set screw or the like.

Referring now to FIG. 3, the shaft 30 is adapted to receive a cam 31 which contains a cam surface 32 disposed substantially concentric with the rotational axis of the shaft 30. The cam 31, as well as the cams to be described, are joined to the shaft by a suitable adhesive or may be keyed or the equivalent. The cam surface 32 is provided with an undulation 33 into which is fitted a follower 36 permitting a shield mounting arm 35 to pivot about axis 34 which is spaced from the axis of the cam. The details of this operation will be more specifically described with the description of FIG. 5. This cam and associated linkage may be omitted if a heat shield is not required. In the present design, it is necessary to provide a heat shield to protect the film when it is stopped for still viewing.

Disposed adjacent the cam 31 is a supply reel operating cam 40 having a cam surface 41 disposed for engagement by the cam follower 42, the latter being mounted on the end of a linkage means 43 which is adapted to control the direction and speed of rotation of the supply reel. Disposed adjacent the cam 41 is a film gate operating cam 44. The cam 44 is disposed for engagement by opposed followers 45 and 46 carried on linkage member 47. The linkage member 47 has an axially projecting finger portion 48 which extends through the wall of the case 11 and moves the film gate to the open position during certain modes of operation as will be seen. The cam 44 is slightly smaller than the adjacent cam 40 so that the side walls of the cam 40 form a guide to prevent lateral shifting of the cam followers 45 and 46 off of the cam track 49.

A cam 50 is formed integral with a spacer 51 which serves as a guide for the opposite side of cam track 49. The cam 50 is provided with a cam track 52 which acts against spring-like followers 53 and 54 carried on the end of linkage member 55 (shown fragmentarily). The linkage member 55, as will be described in detail hereafter, operates to control the direction and speed of the drive means through a driven pulley mounted on the outer end.

Disposed adjacent the cam member 50 is an enlarged cam 56 having a cam track 57 around the outer periphery. The cam track 57 cooperates with an enlarged follower 58 carried on the end of a link 59 having a pivot 60. The link 59 serves to control the direction and speed of rotation of the take-up reel depending upon the selected mode of operation.

A spacer disk 61 is formed with a plurality of notches 62 around the outer circumference. Each of the notches 62 corresponds to one of the modes of operation and facilitates ease of selection by being moved into alignment with a resiliently biased finger means which enters the notch 62. The spacer 61 has a cam track 63 formed in an axially facing wall portion and adapted to cooperate with a follower pin 64 carried on a switch operating linkage member 65. The linkage member 65 has a fixed pivot 66 at one end and a bifurcated portion 67 at the opposite end. The bifurcated portion receives a switch operator (not shown) of a three-position switch which controls the power to the projector lamp and drive motor, as will be seen.

The compactness of the assembly shown in FIG. 3 and the associated linkage members can be appreciated by consideration of FIG. 2. A drive motor of conventional design is indicated in phantom lines at 70 and supports a drive pulley also shown in phantom at 71 which is joined through a drive belt 72 to a main drive pulley 73, the latter being mounted for free rotation on the end of the linkage arm 55. The pulley 73 is provided with an outer friction drive surface 74 formed adjacent a belt groove 75 which permits the drive pulley 73 to drive through a driving belt 77 or by circumferential contact with shutter drive pulley 76. The driving belt 77 joins the shutter drive pulley 76 and the main drive pulley 73 while a circumferential portion 78 of the shutter drive pulley 76 is aligned to engage the circumferential friction drive portion 74 of the pulley 73 to permit direct drive by friction contact between the pulleys 73 and 76. At this point, it can be appreciated that the direction of the shutter drive pulley 76 can be easily varied depending upon whether the belt drive is operated or whether direct drive by circumferential contact between the pulleys 74 and 76 is selected.

The shutter drive pulley 76 is mounted on a shaft 80 which mounts the drive cam 23 disposed on the opposite side of the wall of the projector case 11. Also mounted on the shaft 80 is a shutter 81 of conventional design. On the opposite side of the shutter drive pulley 76 mounted for rotation with the shaft 80 is a pulley 82 which drives elastic belt 83 serving to impart motion to the take-up and supply reels 13 and 15, respectively, in a manner to become apparent. The belt 83 serves to provide rotational motion to the take-up and supply reels, respectively, through take-up and supply idler assemblies indicated generally at 84 and 85 and described in detail below.

The take-up idler assembly 84 includes an idler mounting plate 86 mounted for pivoting movement about fixed pivot 87 on the projector case 11. A fast drive pulley 88 is carried on the idler mounting plate 86 and is driven by the belt 83 being wrapped about a suitable groove (not shown). A circumferential portion 89 of the drive pulley 88 is axially spaced from the belt 83 and may be formed from rubber or rubber-like substance to provide a friction drive when engaged with a circumferential portion of a drive wheel 90, the latter being mounted for rotation with the shaft 12 for driving the take-up reel 13.

Also carried on the idler mounting plate 86 and forming a part of the take-up idler assembly is a second drive pulley 91 having an enlarged portion 92 formed with a belt groove (not shown) which receives the belt 83 causing the pulley assembly 91 to rotate on movement of the belt 83. A coaxial drive portion 93 of reduced diameter is provided with a friction drive surface 94 aligned for movement into engagement with the circumferential surface of the take-up drive wheel 90. As illustrated in the "off" position in FIG. 2, the drive surface 94 is disengaged, being spaced from the circumferential driving surface 95 of the drive wheel 90.

A biasing spring 96 has one end joined to the case 11 while the opposite end is joined to the idler mounting plate 86 below the pivot 87 serving to rotate the plate in a clockwise direction. Such rotation, however, is restrained by a connecting link 97 which extends across the rear wall of the projector case and is joined to the link 43 mounting the cam follower 42. A spring 98 maintains tension on the link 97 urging it to the left and biasing the idler mounting link in a counterclockwise direction. Inasmuch as the link 97 is pinned directly to the link 43, on movement of the link 43 about a fixed pivot 99, the idler mounting plate is shifted about an arcuate path to control the location of the circumferential drives 89 and 94.

The supply idler assembly 85 includes an idler mounting plate 101 mounted for pivoting movement about a fixed pivot 102 on the projector case 11. The idler mounting plate supports a fast drive pulley 103 identical in construction with the fast drive pulley 88 and having a belt receiving groove (not shown) and a circumferential drive portion 104 of rubber or rubber-like substance to form a friction drive when engaged with a circumferential part 105 of a drive wheel 106. The drive wheel 106 is mounted for rotation with the shaft 14 and drives the supply reel 15.

A drive pulley 107 is also mounted on the idler mounting plate 101, being driven by the drive belt 83 engaging a part of the circumference of a belt groove (not shown). A coaxial portion 108 of reduced diameter is provided with a circumferential friction drive surface 109 which is aligned for movement into engagement with the circumferential drive surface of the drive wheel 106 to form a positive friction drive. As illustrated in FIG. 2, when the control knob 26 is in the "off" position, the drive surface 109 is in the disengaged condition, being spaced from the circumferential driving surface 105 of the supply reel drive wheel 106.

The idler mounting plate 101 is provided with a lower arm 110 having a projecting pin 111 thereon. A spring 112 pulls an upper end 114 of the link 59 into engagement with the projecting pin 111, serving to urge the idler mounting plate 101 in a clockwise direction. A second spring 113 is jointed to the opposite side of the link 59 to reduce the force applied by the spring 112 and to assist the cam 56 in moving the link 59, permitting the idler mounting plate 101 to move in a counterclockwise direction to disengage the circumferential drive wheel 103.

The endless belt 83 extends around the drive pulley 82 on the shaft 80 and idler pulleys 115 and 116, which are mounted on adjustable links 117 and 118, respectively. From the idler pulleys 115 and 116, the belt 83 extends in opposite directions around the fast drive pulleys 88 and 103 and the drive pulleys 91 and 107 adjacent the take-up and supply reels, respectively.

The film gate control link 47 pivots about fixed pivot 120, moving the finger 48 back and forth to open and close the film gate 18. Disposed above the finger 48 is an arm 121 which engages an arm 122 mounting the snubber 20. The arm 122 is mounted for movement about the pivot 123 with a spring 124 urging the snubber 20 into contact with a curled-over end portion of the arm 121. It can be appreciated that as the link 47 moves back and forth in response to movement of the cam 44, the link 47 pivots about the fixed pivot 120 to open the film gate and relax the tension during rewind of the film as will be seen.

The switch operating link 65 (FIG. 2) moves about a fixed pivot 126 causing the bifurcated end 67 to shift linearly to the left and to the right of the position shown. The three-position switch operator 127 controls the power to the projection lamp shown in phantom at 128 and to the motor, also shown in phantom at 70. Specifically, the three positions from left to right are: motor energized and projection lamp de-energized, "off," and both motor and projection lamp energized.

Referring now to FIG. 4, the operation of the projector will be described when the control knob 26 is moved to the "forward" mode of operation. When the selector knob 26 is positioned in the "forward" mode of operation, the link 43 moves in the direction of the small arrow as indicated, causing the link 97 to move to the right, shifting the idler mounting plate in a clockwise direction and bringing the circumferential friction drive surface 94 of the forward drive pulley 93 into engagement with the circumferential surface of the pulley 90 to form a friction drive. The link 59 pivots in the direction indicated by the arrow acting in response to movement of the cam 56. This clears the follower pin 111 on the take-up idler plate 101, allowing it to move in a counterclockwise direction about the pivot 102 under the influence of the tension applied by the flexible endless belt 83. In such condition of the idler mounting plate 101, the supply reel 106 is free to turn with the shaft 14 permitting the film to pay off the supply reel at a rate dictated by the drive and framing assembly 21, which will be described in greater detail.

The link 47, which operates the tensioning guide and the gate, remains in the position shown in FIGS. 1 and 2. (In which case the gate is closed, i.e., the pressure plates are in close spaced relation for guiding the film therebetween.) The switch operating link 65 is moved to the far right causing the switch operator 121 to assume the position whereby both the projection lamp (shown in phantom at 69) and the motor (shown in phantom at 70) will be energized. The power control link 55 moves clockwise about pivot 55′ in response to movement of the cam 50 creating a tension in the drive belt 71 thereby transferring rotational movement to the shutter drive pulley 76 and the belt drive pulley 82. In this manner, the endless drive belt 83 is driven, causing rotational motion of the forward drive pulley 91 and rotating the drive wheel 90 and shaft 12 to cause the take-up reel to maintain a tension on the film 16. As pointed out previously, the speed of the film through the gate 18 is selectively and accurately controlled by the drive and framing assembly indicated generally at 21.

The linkage arm 35 supports a heat shield 130 which, in the "forward" mode of operation, is disposed out of the optical axis or the axis along which the light is projected through the film. The heat shield 130 is formed of clear, temperature resistant glass and in all modes of operation, excepting "still" operation which will be described in greater detail with respect to FIG. 5, remains substantially in the position shown in FIG. 4.

As seen in FIG. 5, when the control knob is shifted to the "still" mode of operation, the link 55 moves in a counterclockwise direction relieving the tension on the belt 77. Such movement is in response to movement of the cam 50 as can be appreciated from reference to FIG. 3. The idler mounting plate 101 remains in the position shown and described with respect to the forward drive as the link 59 does not move. The link 43, however, pivots in a counterclockwise direction about fixed pivot 99, pulling the connecting link 97 to the left and moving the idler mounting plate 86 in a counterclockwise direction. Such movement is just sufficient to move the driving surface 94 away from the take-up drive wheel 90. In this condition, both the take-up and drive wheels 90 and 106 are not under the influence of any positive drive other than that imparted if the film should be moved by the snubber 20 or through manual rotation of the framing knob, which will be described in greater detail below. The switch actuating lever 65 remains in the same position shown in FIG. 4, with the motor running and the projection lamp energized. In this mode of operation, a single frame of the film may be viewed for an indefinite period as the heat shield 130 is automatically moved into the optical path of the light to protect the film from undue heat.

As is well known, the optical path is the path traveled by the light from the lamp 69 to the screen (not shown). In the present design, the optical path may be traced from the projection lamp 69 through the opening 131 where it strikes a 45° mirror 29 (FIG. 1) which directs it through the film gate 18 and lens 25. As is apparent in FIG. 5, the heat shield 130 is interposed in the optical path between the opening 131 and the lamp 69. The movement of the heat shield into the optical path is in response to the cam follower 36 being received in the undulation or valley 33 in the cam surface 32 as shown in FIG. 3. Suitable biasing means, such as a spring (not shown) urges the link 35 in an upward or counterclockwise direction about the fixed pivot 34 in order to move the heat shield into position when the cam follower 36 is aligned with the valley 33.

In the "still" mode of operation shown in FIG. 5, the gate remains closed. However, the film will not be driven by the claw 22 since the cam 23 is not driven in this mode of operation.

The condition assumed by the parts when the "reverse" mode of operation is selected can be best understood with reference to FIG. 6. When the control knob rotates the shaft 30 to the "reverse" mode of operation, the link 43 remains in the same condition assumed in "still" operation, that is, the fast drive surface 89 and normal drive surface 94 on idler mounting plate 86 remain spaced from the supply drive wheel 90. The link 59 is moved in a clockwise direction in response to the follower 58 being disposed on a high point of the cam surface 57. As the link 59 moves about the fixed pivot 60, the pin-like follower 111 clears the surface 114 at the top of the link permitting the idler mounting plate 101 to move in a counterclockwise direction. The tension applied by the belt 83 is sufficient to move the idler mounting plate in a counterclockwise direction causing the reverse drive surface 109 to engage the circumferential surface 105 of the supply reel, driving it in a reverse direction.

The power control link 55 is moved counterclockwise causing the circumferential surface 74 of the drive pulley 72 to engage the circumferential surface 78 of the shutter drive pulley 76. In this manner, motion which is opposite in direction to that applied by the belt 77, is applied to the shutter drive pulley causing the endless belt 83 to move in a reverse manner. The switch operator lever 65 remains in the position shown in FIGS. 4 and 5 of the "forward" and "still" modes of operation in which the motor and projection lamp are both energized. The gate operating link 47 is not shown in each of FIGS. 4, 5 and 6 inasmuch as it remains in the same position as shown in the "forward" mode of operation, that is, with the film gate 18 closed for proper driving and guiding of the film. When the various parts are in the "reverse" mode of operation shown in FIG. 6, the drive claw 22 will be oscillated in a reverse path due to opposite rotation of cam 23.

Figure 7:
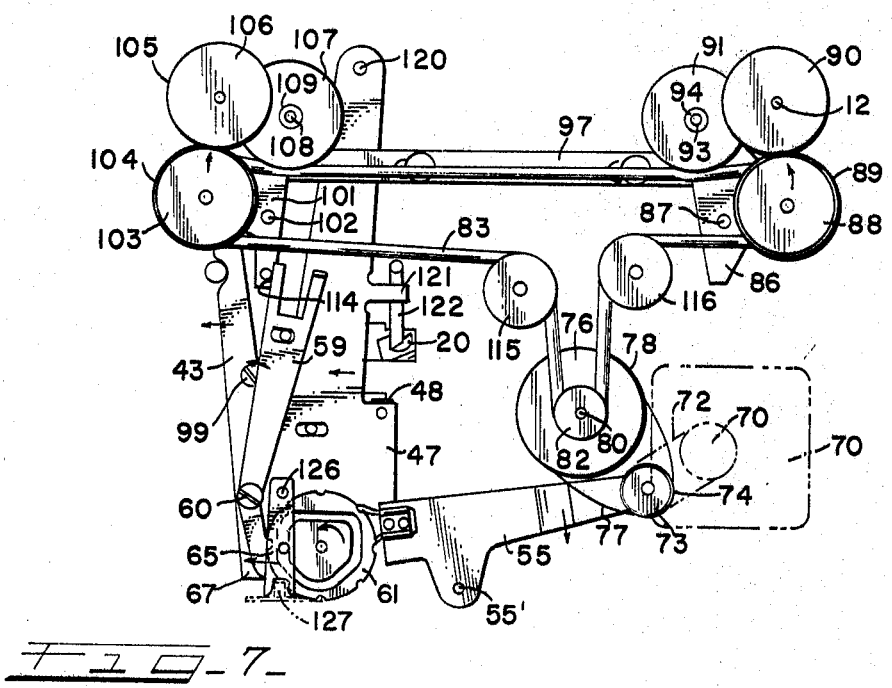
FIG. 7 is a view similar to FIGS. 4 through 6 with the knob in the "stop" position.

When the control knob 26 is moved to the "stop" mode of operation from the "reverse" mode shown in FIG. 6, the final condition assumed by the links is shown schematically in FIG. 7. The link 43 moves in a counterclockwise direction about the pivot 99 pulling the connecting link 97 to the left and rotating the mounting plate 86 in a counterclockwise direction to bring the drive wheel 88 into engagement with the drive wheel 90. The link 47 moves clockwise as indicated by the arrow or about the pivot 120 causing the tension guide 20 to move to the left and initiating opening of the film gate 18.

The link 59 moves in a counterclockwise direction about the pivot 60 causing the idler mounting plate 101 to move in a clockwise direction bringing the outer surface 104 of the drive wheel 103 into engagement with the drive surface 105 of the drive wheel 106. This causes the wheels to be held against rotation as the link 55 supporting the main drive pulley 73 moves in a clockwise direction to space the outer circumference of the main drive pulley 73 from the drive surface 78 of the shutter drive pulley 76. The link 55 does not move a sufficient distance to tighten the belt 77, however, and therefore no rotation is imparted to the shutter drive pulley 76 on the up and down cam 23.

From the "stop" position shown in FIG. 7, the control knob 26 may be moved clockwise one additional step to the "fast forward" condition as shown in FIG. 8. The position of the link 43 (not shown in FIG. 8) remains unchanged by the shifting of the knob and, therefore, the friction drive surface 89 on the drive pulley 88 remains in engagement with the drive wheel 90 on the take-up supply reel shaft 12. The link 59, however, moves in a clockwise direction causing the supply drive pulley 103 to move away from the circumferential surface 105 of the drive wheel 106. This permits the shaft 14 to rotate freely to allow the film to pay off the supply reel (not shown) in response to pulling by the take-up reel 15. Link 47 moves further in a clockwise direction pulling the tension guide 20 and fully opening the film gate 18 for the free passage of film therethrough without interference from the drive claw 22. When the gate is opened, the guide 20 and forward aperture plate 18a are shifted to the right as seen in FIG. 1 allowing the film to pass free of the drive claw.

The power supply link 55 moves in a counterclockwise direction to bring the friction drive surface 74 of the main drive pulley 73 into engagement with the circumferential drive surface 78 of the shutter drive pulley 76. Thus, rotational motion is transferred from the shutter drive pulley 76 to the power pulley 82 and the belt 83 to drive the take-up reel through the fast drive pulley 88.

When the desired location on the film is reached, the control knob 26 may be shifted to "stop" and then to the "forward" mode of operation to view the selected area of the film at a normal or slow rate. In the "fast forward" mode of operation and the "stop" mode shown in FIG. 7, the power switch operating link 65 remains in substantially the same position with the switch operator (shown in phantom at 127) to energize the motor alone and de-energize the projection lamp conserving lamp life and reducing heat.

The "rewind" mode of operation shown in FIG. 9 is located between "off" and "stop" on the positions of the control knob. The condition of the links for each of these positions is shown in FIGS. 2 and 7, respectively. When the knob is moved to the "rewind" condition, the link 43 moves in a clockwise direction to move the operator 97 to the right, shifting the idler mounting plate 86 about the pivot 87 to release the drive on the take-up pulley. The link 47 assumes the same condition shown in FIG. 8 to hold the film gate 18 open for free passage of the film without interference from the drive claw 22. Link 59 remains in the same position shown in FIGS. 2 and 7 with the drive surface 104 of the fast drive pulley 103 engaged with the circumferential surface 105 of the drive wheel 106. Thus, approximately a 1:1 drive ratio is available between the two pulleys. The power supply link 55 moves about the pivot 55' in a clockwise direction to tension the belt 77 and drive the shutter drive pulley 76 thereby causing the power pulley 82 to drive the belt 83 and causing movement of the fast drive pulley 103. The switch operating link 65 in this condition is the same as in the "fast forward" position, that is, with the motor energized while the projection lamp is de-energized. When the film is rewound to the desired degree, the control knob may be switched either clockwise or counterclockwise to the "off" or "stop" mode of operation, respectively, and from there may be shifted to any selected mode of operation such as "forward," "still," "reverse," etc.

It can be appreciated that the single control knob provides a means whereby those with little mechanical aptitude may operate a motion picture projector having various modes of operation, each of which is easily selected. The home viewer may review the films quite conveniently without necessitating the operation of several switches to select the various modes of operation, as the present design permits the selection of the various modes of operation through rotation of a single control knob.

Referring to FIG. 1, the drive claw 22 is moved in a vertical path by the cam 23 causing the drive claw to oscillate in a generally vertical direction. A biasing spring 121 urges the drive claw forward causing a pin 131' at the rearward part of the drive claw 22 to engage a first in-and-out cam 132 mounted for rotation about a fixed shaft 150 (FIG. 15). A second in-and-out cam 133 is mounted on the shaft 150 for rotation about the same axis as the cam 132 with rotational motion provided by a large gear 134 driven from a smaller gear 135, the latter being mounted for rotation with the shaft 80 supporting the drive cam 23. When either of the cams 132 and 133 is engaged by the follower pin 131', they function to control the horizontal or in and out movement of the drive claw 22, controlling the frequency with which it enters the film gate 18 and hence the speed of film movement past the projectioin lens since the vertical motion of the claw is constant. By way of example, when the follower pin 131' is positioned in engagement with the normal speed cam 132 as shown in FIG. 10, the drive claw moves into the film gate three times for every revolution of the cam 132 and the film will move through the film gate 18 at a normal viewing rate.

Figure 12:
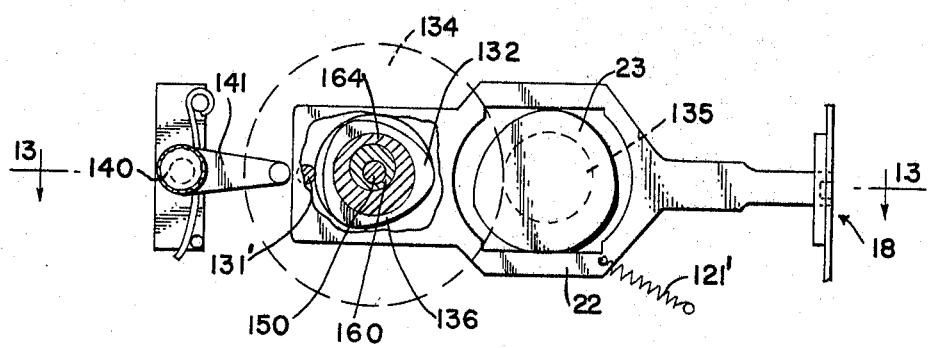
FIG. 12 is an enlarged front elevational view of the mechanism of FIGS. 10 and 11 with the mountings removed and illustrating the location of the cams relative to each other.

The slow motion cam 133 has a portion of its camming surface which is coextensive with the camming surface of the normal speed cam 132, this being represented by the reference numeral 136 in FIG. 12. The remainder of the camming surface on the cam 133 is substantially circular so that when engaged with the follower pin 131' it precludes the entry of the drive claw 22 into the film gate 18, permitting the drive claw 22 to enter the film gate only once for every revolution of the cam 133. Accordingly, the film 16 moves through the film gate 18 at one-third the normal viewing speed to permit slow motion viewing.

Figure 10:
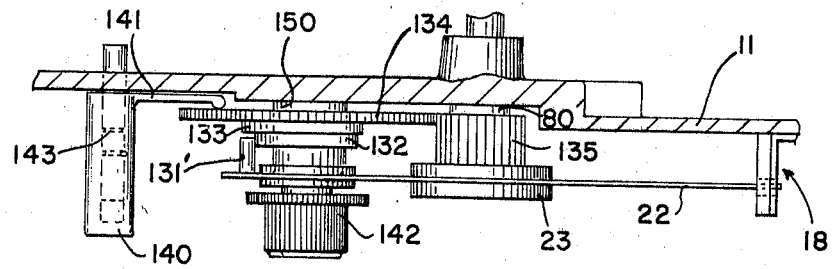
FIG. 10 is a cross-sectional view taken generally along the lines 10—10 of FIG. 1 with the speed selector knob in the normal drive position.
Figure 11:
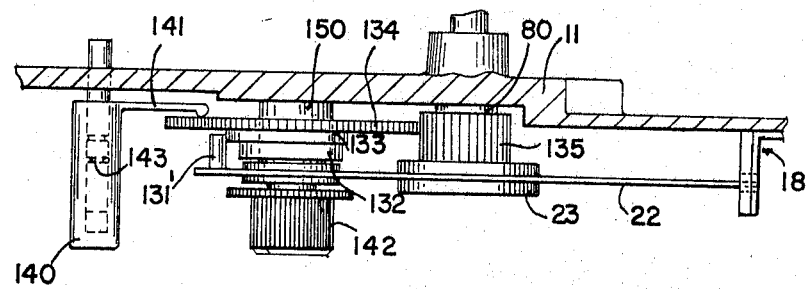
FIG. 11 is a view similar to FIG. 10 with the cam adjusted to show the slow motion position.

Speed selection is easily accomplished by a knob 140 having an arm 141 integral therewith in engagement with the inside of the gear 134 as seen in FIGS. 10 and 11. When the knob 140 is pulled away from the case 11 to the position shown in FIG. 11, the large gear 134 and cams 132 and 133 move axially along the shaft 150 when the coextensive surface 136 on the two cams is aligned with the follower 131 permitting the follower pin 131' to ride on the camming surface of the slow motion cam 133. The follower pin 131' on the rearward portion of the drive claw 22 will then follow the surface of the slow motion cam 133 to limit the entry of the drive claw into the film to a frequency of one entry per every revolution of cam 23. The vertical drive cam 23 will continue to oscillate the claw in a vertical direction at the same frequency irrespective of the position of the knob 140. A framing knob 142 is provided on the normal and slow motion cams to permit manual alignment of the film frame with the optical axis in the projection lens 25. The framing function will be described in detail below with reference to FIGS. 13-15.

The slow motion in-and-out cam 133 is usually employed when the projector is in its "forward" mode of operation. When the projector is in the "forward" mode of operation, the take-up reel is driven in timed relation with movement of the drive claw 22 which is imparted by the combined action of the up-and-down cam 23 and the normal in-and-out cam 132. When the slow motion in-and-out cam 133 is brought into play, the movement of film through the gate is of course much slower in which case slippage will occur, most likely between the take-up wheel 90 and the frictional drive surface 94. Such slippage can readily be tolerated and presents no problems during slow motion operation.

If desired, the knob 140 may be provided with a suitable spring detent which enters a spring detent groove 143 when the knob is in the slow motion viewing position. Obviously, other types of detent means of equivalent forms are equally well suited. Suitable spring means (not shown) may be provided to push the gear 134 and integral cams 132 and 133 to the normal viewing position after the knob 140 has been moved to the position shown in FIG. 10.

Referring now to FIGS. 13-15, the framing arrangement will be specifically described. The framing assembly is shown in cross section in FIG. 13 and includes the framing knob 142 supporting a cam 160 which may be press-fitted into the rearward part of the knob, and is eccentrically disposed on the shaft 150 for rotation thereabout. In FIG. 15, a camming surface 161 on the cam 160 is positioned within a slide block 162 which is received in a generally rectangular opening 163 formed in the rearward part of the drive claw 22. A pair of annular guides 163 and 164 is disposed on opposite sides of the block 162 to maintain the drive claw 22 properly located on the cam surface 161.

As is well known, in the single speed control type motion picture projectors, framing is easily accomplished by merely changing the location of the path of travel of the claw fingers 165 and 166 (shown in FIG. 14) up or down so that the frames will be properly positioned relative to the gate apertures. This manner of framing is the same in the present design, however, is complicated where one or more speed selector cams 132 and 133 are provided on a single shaft. As is evident, the problem of providing a suitable simple framing arrangement becomes more difficult if the overall simplicity and associated reliability of the projector is to be retained.

In the present design, the framing knob 142 (shown fragmentarily in FIG. 14) may be rotated, causing the cam 160 to rotate the cam surface 161 within the block 162. By reason of the eccentric mounting of the cam 160, this movement causes a vertical shifting of the rearward part of the drive claw 22, thus pivoting the drive claw 22 about the up-and-down cam 23. This, in turn, causes the fingers 165 and 166 on the opposite end of the drive claw 22 to move upward or downward to a slight degree to assure the proper framing of the film passing through the gate. It is to be appreciated that the speed selection may be performed without affecting the framing adjustment inasmuch as the speed selector cams 132 and 132 are axially shiftable along an axis disposed at right angles to the plane of movement of the fingers 165 and 166 and the drive claw 22. In addition, the position of the follower 131' is not affected by the axial shifting of the cams 132, 133 and, therefore, once properly framed, the film will remain framed when selection is made from one of the in-and-out cams to the other. Accidental shifting of the framing knob can be avoided by providing a spring detent which cooperates with the teeth 167 formed on the outer circumference of the framing knob 142, such expedient being well known in the art.

During framing, the position of the cam follower 131' relative to the in-and-out cams 132, 133 is changed slightly. However, this slight change does not materially alter the shape of the orbital path of movement of the claw fingers.

From the foregoing description, it can be appreciated that the selection of a suitable film speed is easily accomplished. The mechanism which provides for slow motion viewing is extremely simple when contrasted with prior art types, permitting the addition of this feature to relatively inexpensive projector designs without a substantial increase in over-all costs and making this feature available on inexpensive models.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. In a moving picture projector having take-up and supply reels, the improved construction for alternately driving said reels in opposite directions and at different rates of speed comprising, a pair of wheels on respective spindles of said take-up and supply reels for driving the same, first and second rollers of different diameters shiftably mounted adjacent said supply wheel for alternate driving engagement with the periphery of the latter, a belt connected with said first and second rollers for rotating the same in opposite directions upon movement of the belt in one direction, third and fourth rollers of different diameters shiftably mounted adjacent said take-up wheel for alternate driving engagement with the periphery of the latter, said belt being connected with said third and fourth rollers for rotating the same in opposite directions upon movement of the belt in said one direction, means including controls means for driving said belt in said one direction and in the opposite direction, said control means also including linkage means operated thereby for placing said first and fourth rollers in alternate driving engagement with respective supply and take-up wheels when said belt is driven in said one direction and for placing said second and third rollers in alternate driving engagement with respective supply and take-up wheels when said belt is driven in the opposite direction.

2. The improvement according to claim 1 further defined by, said projector including a gate having members relatively movable for opening and closing the gate, said linkage means being connected with further linkage in turn connected to one of said members for opening the gate when either said first or third rollers are in driving engagement with respective supply and take-up wheels and for closing the gate when either said second or fourth rollers are in driving engagement with respective supply and take-up wheels.

3. The improvement according to claim 1 wherein said means is further defined by, a drive wheel engaged with said belt for driving the same, a drive pulley mounted by support means for movement by said control means back and forth between a first position in engagement with said drive wheel, a second position spaced from said drive wheel and a neutral position therebetween, motor means driving said drive pulley in each of said positions, a driving belt encircling both said drive pulley and said drive wheel and dimensioned for being drawn taut only when the former is in said second position, said driving belt encircling said drive wheel to rotate the latter in the same direction as said drive pulley.

4. The improvement according to claim 3 wherein said control means includes means interconnecting said linkage means and said support means to shift simultaneously said first and third rollers into engagement with respective supply and take-up wheels when said drive pulley is in the neutral position thereof.

5. The improvement according to claim 3 further defined by, a heat shield mounted on an arm movable by said control means into and out of the optical axis of said projector between the light source and the projection gate thereof, cam means operated by said control means and interconnecting said support means and said arm means for shifting said heat shield into the optical axis when said drive pulley is in its neutral position and shifting said heat shield out of the optical axis when the drive pulley is in its first and second positions.

6. In a motion picture projector having a light source, a supply reel and a take-up reel, drive claw means for moving film through a film gate, the improvement which comprises, a single control means for selectively operating said take-up reel in a forward direction at a normal rate and a faster than normal rate, and for selectively operating said supply reel in a reverse direction at a normal rate and a faster than normal rate, said single control means including a shaft, a first cam mounted on said shaft, a first linkage means having a cam follower portion thereon engageable with said first cam, said first linkage means having driving means thereon operative to control direction and speed of rotation of said supply reels, a second cam mounted on said shaft and engaging a cam follower mounted on second linkage means, said second linkage means having means thereon to open said film gate in response to movement of said second cam, a third cam on said shaft, said third cam having a third linkage means in engagement therewith, said third linkage means having driving means thereon operative to control the direction and speed of rotation of said take-up reels, each of said cams being oriented angularly about a shaft axis relative to the other to permit selection of a single operative condition for each of said reels by rotation of said shaft.

7. The improvement in motion picture projectors as defined in claim 6 including a film speed selector means selectively to move said drive claw means at diverse rates of speed, said film speed selector including an up-and-down cam to move said drive claw means in a generally vertical direction, a pair of in-and-out cams mounted for rotation about an axis spaced from the axis of rotation of said up-and-dawn cam, means to selectively move said speed control cams into alternate enegagement with a follower means on said drive claw means whereby the speed of film movement is controlled through control of the frequency of said drive claw entering said film gate.

8. A motion picture projector for projecting a motion picture film on a screen for viewing, said projector comprising a film supply reel and a take-up reel, a film guide means through which said film is guided as it moves between said supply and take-up reels, a light source positioned to emit light through said film guide means and said films, shutter means adapted to interrupt light from said light source to said film guide means, motor means for supplying rotational movement to said reels and said shutter means, a single knob control means for operating said motion picture projector permitting selection of conditions of forward and fast forward movement, still projection, reverse and rewind, said single knob control means including a rotatable shaft, a first cam mounted on said shaft, a first linkage means having a cam follower portion at one end and a supply reel driving means at an opposite end, said supply reel driving means being operative to control the direction and speed of rotation of said supply reel, a second cam on said shaft, second linkage means having a cam follower portion engaging said second cam, said second linkage means being operative to shift said film guide means between closed and open positions to permit normal and rapid film movement therethrough, respectively; a third cam means mounted on said shaft, a third linkage means having a cam follower portion engaging said third cam means and a take-up reel driving means mounted thereon, said take-up reel driving means being operative to control the direction and speed of rotation of said take-up reel, a fourth cam mounted on said shaft, a fourth linkage means having a cam follower portion and a motion transmitting portion adapted to connect said motor with said supply and take-up reel driving means for driving the latter, a fifth cam mounted on said shaft and a fifth linkage means having a cam follower portion thereon and being operative during rotation of said shaft selectively to control a switch means, said switch means controlling power to said light source and said motor whereby said light source and said motor may be selectively energized and de-energized in response to the selected mode of film operation.

9. The motion picture projector of claim 8 wherein a sixth cam is mounted on said shaft and a sixth linkage means having a cam engaging portion mounts a heat shield thereon, said sixth linkage means cooperating with said sixth cam means permitting said heat shield to be automatically interposed between said light source and film gate when the single control knob is moved to a still projection position.

10. The motion picture projector of claim 8 including film speed selector means to permit selection of the speed of said film through said film guide means, said film speed selector means including a drive claw, an up-and-down cam driven with said shutter means to move said drive claw in a vertical direction, a pair of speed selector cams, one of said speed selector cams being engaged by a follower on said drive claw to control frequency of movement of said drive claw towards said film guide means, biasing means maintaining said last named follower in alternate engagement with said speed selector cams, means to shift said speed selector cams into alternate engagement with said follower on said drive claw to change the frequency of movement of said drive claw into said film guide means, and eccentric framing means engaged with the drive claw to permit shifting of the path traveled by the film engaging portion of said drive claw.

11. In a motion picture projector of the type having a gate with a projection aperture and through which gate a motion picture film is intermittently advanced past the aperture therein for the projection of successive frames thereon, the improvement comprising, a planar claw member having a film engaging finger at one end thereof, an up-and-down cam rotatably mounted about an axis perpendicular to the plane of the claw member and engaged with the latter intermediate its ends for imparting up and down movements to the claw member in such plane, means for driving said up-and-down cam at a given frequency, at least a pair of in-and-out cams having different cam surfaces extending around their respective edges, which in-and-out cams are mounted for rotation in unison about a common axis in parallel spaced relation with the axis of rotation of the up-and-down cam, means for rotating said in-and-out cams in timed relation with said in-and-out cam, a cam follower mounted on said claw member adjacent the other end thereof, said in-and-out cams being shiftable along the axis of rotation thereof for bringing said cam surfaces into alternate engagement with said cam follower thereby to impart in and out movements to said claw finger in said plane at different time relations with up and down movement thereof, and means for holding said cam follower in alternate engagement with said cam surfaces.

12. The improvement according to claim 11 further defined by framing means comprising, an eccentric framing member mounted for rotation about said common axis, a slide member rotatably carried by said framing member and being shiftable in said plane in generally up and down directions upon rotation of the framing member, said claw member having an opening in said other end thereof slidably engaging said slide for in and out movements only, whereby shifting of said slide changes the location of the path of movement of said claw finger for framing the film at said gate.

13. The improvement according to claim 11 wherein said up-and-down cam is associated with a first annular series of gear teeth for rotation therewith, a second annular series of gear teeth mounted for rotation with said in and out cams, said first and second series of gear teeth being in meshing engagement with each other and constituting said means for rotating said in-and-out cams in timed relation with said up-and-down cam.

14. In a motion picture projector wherein a film is pulled through a film guide by means of a drive claw having at least one claw finger, said finger being adapted to interfit with an aperture in said film, means oscillating said finger in a generally vertical direction parallel to the path of said film through said film guide at a given frequency, the improvement comprising, an adjustable speed selector cam means for use in controlling the frequency of movement of said finger into said apertures in said film whereby the rate of movement of said film through said film gate may be controlled, said adjustable speed selector cam means including a pair of juxtaposed in-and-out cams mounted on a shaft for rotation about an axis perpendicular to the plane of movement of said drive claw, means rotating said speed selector cam means at a uniform rate in timed relation to said means oscillating said finger in a vertical direction, and a cam follower on said claw in alternate engagement with said juxtaposed cams, means biasing said cam follower into alternate engagement with said cams, said in and out cams controlling the frequency of said finger engaging said film, means for shifting said cams into alternate engagement with said cam follower whereby the rate of film movement through said film guide may be selectively controlled.

15. The improvement in motion picture projectors as defined in claim 14 wherein said means driving said finger in a generally vertical direction includes a rotating up-and-down cam engaging said drive claw, said up-and-down cam being mounted on a shaft and oscillating said claw in a generally vertical direction, said last named shaft having a shutter plate carried thereon, and said means rotating said adjustable speed selector cam means including a driving gear mounted on said shaft driving said shutter plate and engaging a gear driving said speed selector cam means.

16. In a motion picture projector including a gate through which motion picture film is advanced for projection of successive image frames, drive means for advancing said motion picture film through said gate, said drive means including a film claw, a first means for oscillating said film claw in a vertical direction, a second means for moving said film claw in a generally horizontal direction in timed relation to said vertical oscillating of said film claw whereby said film claw will enter said gate to advance said motion picture film therethrough, said second means for moving said film claw including at least two different cams rotatable about an axis, a single cam follower connected with said claw and adapted for alternate engagement with said cams, means to permit selective movement of said cams into position for alternate engagement by said cam follower thereby permitting the frequency of said film claw entering said gate to be selected for normal or slow motion viewing, and eccentric framing means mounted for movement about said axis and connected with the film claw for changing the position of the path of movement of the latter.

17. The motion picture projector of claim 16 wherein said framing means includes an eccentric cam rotatably engaged with a member which is slidably engaged with the film claw.

18. In a moving picture projector having take-up and supply reels, the improved construction for alternately driving said reels in opposite directions and at different rates of speed comprising, a pair of wheels on respective spindles of said take-up and supply reels for driving the same, first and second rollers of different diameters shiftably mounted adjacent said supply wheel for alternate driving engagement with the periphery of the latter, third and fourth rollers of different diameters shiftably mounted adjacent said take-up wheel for alternate driving engagement with the periphery of the latter, drive means, belt means connecting said drive means with all of said rollers for simultaneously driving the latter, control means for selectively operating said drive means, said control means also including linkage means operated thereby for placing said rollers one-at-a-time into driving engagement with the associated wheel.

References Cited
UNITED STATES PATENTS

| | | | |
|---|---|---|---|
| 2,136,930 | 11/1938 | Albrecht et al. | 226—63 |
| 2,907,532 | 10/1959 | Briskin et al. | 352—124 XR |
| 3,018,976 | 1/1962 | Nemeth | 352—124 XR |
| 3,159,841 | 12/1964 | Castedello et al. | 352—124 XR |

NORTON ANSHER, Primary Examiner

DAVID S. STALLARD, Assistant Examiner

U.S. Cl. X.R.

352—184, 191, 194